(12) United States Patent
Narayanan (10) Patent No.: US 11,087,769 B1
(45) Date of Patent: Aug. 10, 2021

(54) USER AUTHENTICATION FOR VOICE-INPUT DEVICES

(71) Applicant: Amazon Technologies, Inc., Seattle, WA (US)

(72) Inventor: Preethi Narayanan, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/861,573

(22) Filed: Jan. 3, 2018

Related U.S. Application Data (63) Continuation of application No. 15/068,967, filed on Mar. 14, 2016, now Pat. No. 9,865,268, which is a continuation of application No. 13/624,633, filed on Sep. 21, 2012, now Pat. No. 9,286,899.

(51) Int. Cl.
*G10L 17/24* (2013.01)
*G06F 21/32* (2013.01)
*G10L 17/06* (2013.01)

(52) U.S. Cl.
CPC .............. *G10L 17/24* (2013.01); *G06F 21/32* (2013.01); *G10L 17/06* (2013.01)

(58) Field of Classification Search
USPC ........................................ 704/246–250, 275
See application file for complete search history.

(56) References Cited

U.S. PATENT DOCUMENTS 6,219,639 B1   4/2001 Bakis et al.
6,671,672 B1  12/2003 Heck
6,931,104 B1 * 8/2005 Foster ................... H04M 1/247
                                                    379/88.02
7,158,776 B1 * 1/2007 Estes ....................... H04L 63/02
                                                    380/247
7,254,383 B2 * 8/2007 Novack ............... H04L 63/0861
                                                    455/410
7,418,392 B1   8/2008 Mozer et al.
7,536,304 B2   5/2009 Di Mambro et al.
(Continued)

FOREIGN PATENT DOCUMENTS

WO   WO2011088053   7/2011

OTHER PUBLICATIONS

Office Action for U.S. Appl. No. 15/068,967, dated Oct. 27, 2016, Preethi Narayanan,"User Authentication for Voice-Input Devices", 14 pages.

(Continued)

*Primary Examiner* — Jesse S Pullias
(74) *Attorney, Agent, or Firm* — Lee & Hayes, P.C.

(57) ABSTRACT

Techniques for authenticating users at devices that interact with the users via voice input. For instance, the described techniques may allow a voice-input device to safely verify the identity of a user by engaging in a back-and-forth conversation. The device or another device coupled thereto may then verify the accuracy of the responses from the user during the conversation, as well as compare an audio signature associated with the user's responses to a pre-stored audio signature associated with the user. By utilizing multiple checks, the described techniques are able to accurately and safely authenticate the user based solely on an audible conversation between the user and the voice-input device.

20 Claims, 3 Drawing Sheets

(56) References Cited

U.S. PATENT DOCUMENTS

| | | | |
|---|---|---|---|
| 7,620,547 B2* | 11/2009 | Kompe | G10L 15/065 |
| | | | 704/243 |
| 7,716,055 B1 | 5/2010 | McIntosh et al. | |
| 7,720,683 B1 | 5/2010 | Vermeulen et al. | |
| 7,774,204 B2 | 8/2010 | Mozer et al. | |
| 8,032,383 B1* | 10/2011 | Bhardwaj | G10L 15/30 |
| | | | 455/420 |
| 9,286,899 B1 | 3/2016 | Narayanan | |
| 2003/0046083 A1 | 3/2003 | Devinney, Jr. et al. | |
| 2003/0125944 A1* | 7/2003 | Wohlsen | G10L 17/24 |
| | | | 704/246 |
| 2003/0163739 A1 | 8/2003 | Armington et al. | |
| 2004/0010408 A1* | 1/2004 | Mani | H04M 3/38 |
| | | | 704/246 |
| 2005/0184958 A1* | 8/2005 | Gnanamgari | G06F 3/0386 |
| | | | 345/157 |
| 2006/0136219 A1 | 6/2006 | Wang | |
| 2006/0285665 A1* | 12/2006 | Wasserblat | G10L 17/26 |
| | | | 379/114.14 |
| 2006/0286969 A1* | 12/2006 | Talmor | G06F 21/32 |
| | | | 455/415 |
| 2007/0219792 A1 | 9/2007 | Normandin | |
| 2008/0208580 A1 | 8/2008 | Scholl | |
| 2009/0150320 A1* | 6/2009 | Geppert | G06F 21/31 |
| | | | 706/47 |
| 2009/0326942 A1 | 12/2009 | Fulop | |
| 2011/0141106 A1* | 6/2011 | Runge | G06K 9/00221 |
| | | | 345/419 |
| 2012/0223885 A1 | 9/2012 | Perez | |
| 2014/0092242 A1* | 4/2014 | Krishnan | H04N 7/181 |
| | | | 348/143 |

OTHER PUBLICATIONS

Office Action for U.S. Appl. No. 13/624,633, dated Dec. 24, 2014, Preethi Narayanan, "User Authentication for Devices Using Voice Input or Audio Signatures", 19 pages.

Office Action for U.S. Appl. No. 13/624,633, dated Apr. 30, 2014, Preethi Narayanan, "User Authentication for Voice-Input Devices", 16 pages.

Final Office Action for U.S. Appl. No. 13/624,633, dated May 13, 2015, Preethi Narayanan, "User Authentication for Devices Using Voice Input or Audio Signatures", 21 pages.

Office action for U.S. Appl. No. 15/068,967, dated May 5, 2016, Narayanan, "User Authentication for Voice-Input Devices", 20 pages.

Office Action for U.S. Appl. No. 13/624,633, dated Aug. 25, 2014, Narayanan, "User Authentication for Devices Using Voice Input or Audio Signatures", 19 pages.

Pinhanez, "The Everywhere Displays Projector: A Device to Create Ubiquitous Graphical Interfaces", IBM Thomas Natson Research Center, Ubicomp 2001, Sep. 30-Oct. 2, 2001, 18 pages.

* cited by examiner

USER AUTHENTICATION FOR VOICE-INPUT DEVICES

CROSS-REFERENCE TO RELATED APPLICATIONS

This application is a continuation of, and claims priority to, co-pending, commonly-owned U.S. patent application Ser. No. 15/068,967, entitled "User Authentication for Voice-Input Devices", filed on Mar. 14, 2016 which is a continuation of U.S. patent application Ser. No. 13/624,633, entitled "User Authentication for Voice-Input Devices", filed on Sep. 21, 2012, which are incorporated herein in their entirety by reference.

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

When interacting with a device through speech, it may be important to ensure that someone claiming to be a particular user is in fact that user. As such, a computing device that interacts with a user through speech may attempt to verify the identity of the user prior to granting the user access to the device. This avoids the scenario where a hacker is able to gain access to the device and cause the device to perform certain unauthorized actions by falsifying his or her identity.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes, in part, techniques for authenticating users at devices that interact with the users via voice input. For instance, the described techniques may allow a voice-input device to safely verify the identity of a user by engaging in a back-and-forth conversation. The device or another device coupled thereto may then verify the accuracy of the responses from the user during the conversation, as well as compare an audio signature associated with the user's responses to a pre-stored audio signature associated with the user. By utilizing multiple checks, the described techniques are able to accurately and safely authenticate the user based solely on an audible conversation between the user and the voice-input device.

In one example, a user may first request to initiate a transaction with a voice-input device. For instance, a user may request that the device place a telephone call, play a certain audio file, purchase an item on behalf of the user or perform any other action. In response, the device may attempt to authenticate the user in order to determine whether or not the user has authorization to instruct the device to perform the specified operation.

As such, the device may output (e.g., via a display, via a speaker, etc.) a request that a user utter or spell a password associated with the user. In some instances, the device first makes a preliminary identification of the user based on the audio signature of the user's initial request to initiate the transaction. That is, the device may compare the audio signature associated with the initial request to one or more pre-stored signatures to generate a preliminary identification. In other instances, the device requests that the user explicitly identify his or herself (e.g. by requesting that the user state his or her name). In other instances, the device may identify the user after receiving the user's password and mapping the password to the user to whom the password has been associated with.

Regardless of whether the device makes a preliminary identification of the user before or after requesting the password, the user may utter or spell his or her password after the device requests the password. The device may capture sound at a microphone of the device, generate an audio signal corresponding to the sound, and perform speech recognition on the audio signal to identify the password uttered or spelled by the user. The device may then compare this password to the password previously associated with the user. If the passwords do not match, then the device may deny the user's request to initiate the transaction.

If, however, the passwords match, then the device may identify an audio signature of the generated audio signal. An audio signature may be based, in part, on features such as a frequency of the audio signal, a pitch of the audio signal, a decibel level of the audio signal, and/or other audio features identifiable from the signal. The device may then compare this audio signature to an audio signature previously associated with the user. If these audio signatures do not match (i.e., do not have a calculated similarity that is greater than a predefined threshold), then the device may refrain from initiating the requested transaction. If, however, the audio signatures match, then the device may proceed to continue a dialog with the user for the purpose of accurately authenticating the user.

For instance, the device may identify one or more questions that have been associated with the user and have answers previously selected by the user. Answers to these questions may be based on knowledge that is generally known to the user, but not necessarily to other users. These questions may include questions about where a user was born, what the name of their first pet was, where they attended elementary school, what their last request to the device was, and/or the like.

After identifying these questions (and corresponding answers previously selected by the user), the device may output one or more of the questions to the user (e.g., audibly, visually, or in any other manner). The user attempting to authenticate at the device may then speak an answer to each posed question. The device may again capture this sound at the microphone, generate a corresponding audio signal and perform speech recognition on the audio signal to identify each answer. After identifying the answer(s) in the audio signal, the device may compare the answer (or answers) to the answer previously selected by the user. If the answers do not match, then the device may refrain from initiating the requested transaction.

If, however, the answers match, then the device may again compare an audio signature from the audio signal associated with the user's uttered answer(s) to the audio signature associated with the user. If the signatures do not match, then the device may refrain from initiating the requested transaction. If the signatures match, however, then the device may proceed to continue authentication of the user.

For instance, the device may then output a request that the user utter (or spell) a random phrase (i.e., one or more particular words). For instance, the device may output the following request via a speaker of the device: "Please state the phrase: 'Apples and Bananas'". The device may then capture sound of the user, generate a corresponding audio signal, and perform speech recognition on the audio signal to identify any words spoken (or spelled). If the words in the speech do not match the requested random phrase, then the device may refrain from initiating the requested transaction.

If, however, the words match, then the device may again compare an audio signature of the audio signal to the audio signature associated with the user. If the audio signatures do not match, then the device may refrain from initiating the requested transaction. If the audio signatures match, however, then the device may proceed to initiate the requested transaction for the user. For instance, the device may place the requested telephone call, play the requested song, place an order for the specified item or the like.

By utilizing a back-and-forth conversation when authenticating a user, the techniques described herein minimize the chance that a hacker will be able to falsify an identity. For instance, even if a hacker were to have access to a voice recording of the user stating her password (and, hence, may accurately deceive the device when the device requests that the user state their password), the hacker might not know (or have recorded in the user's voice) the answers to the questions posed by the device. Furthermore, even if the hacker did have these answers recorded in the user's voice, the hacker would not likely be able to replicate the user speaking a random phrase that has been dynamically selected by the device.

While a few non-limiting examples have been described, it is to be appreciated that the voice-input devices may engage in any other type of conversation with the user for the purpose of authenticating the user. Furthermore, the components of this conversation may occur in any order and the device may process and verify the responses in any order and/or manner (e.g., in parallel, serially, all at once, etc.). Further, while the example described above discusses the device performing the verification and speech recognition, in other instances one or more other devices accessible to the voice-input device may perform one or more of these operations.

The devices and techniques described above and below may be implemented in a variety of different architectures and contexts. One non-limiting and illustrative implementation is described below.

Illustrative Environment

Figure 1:
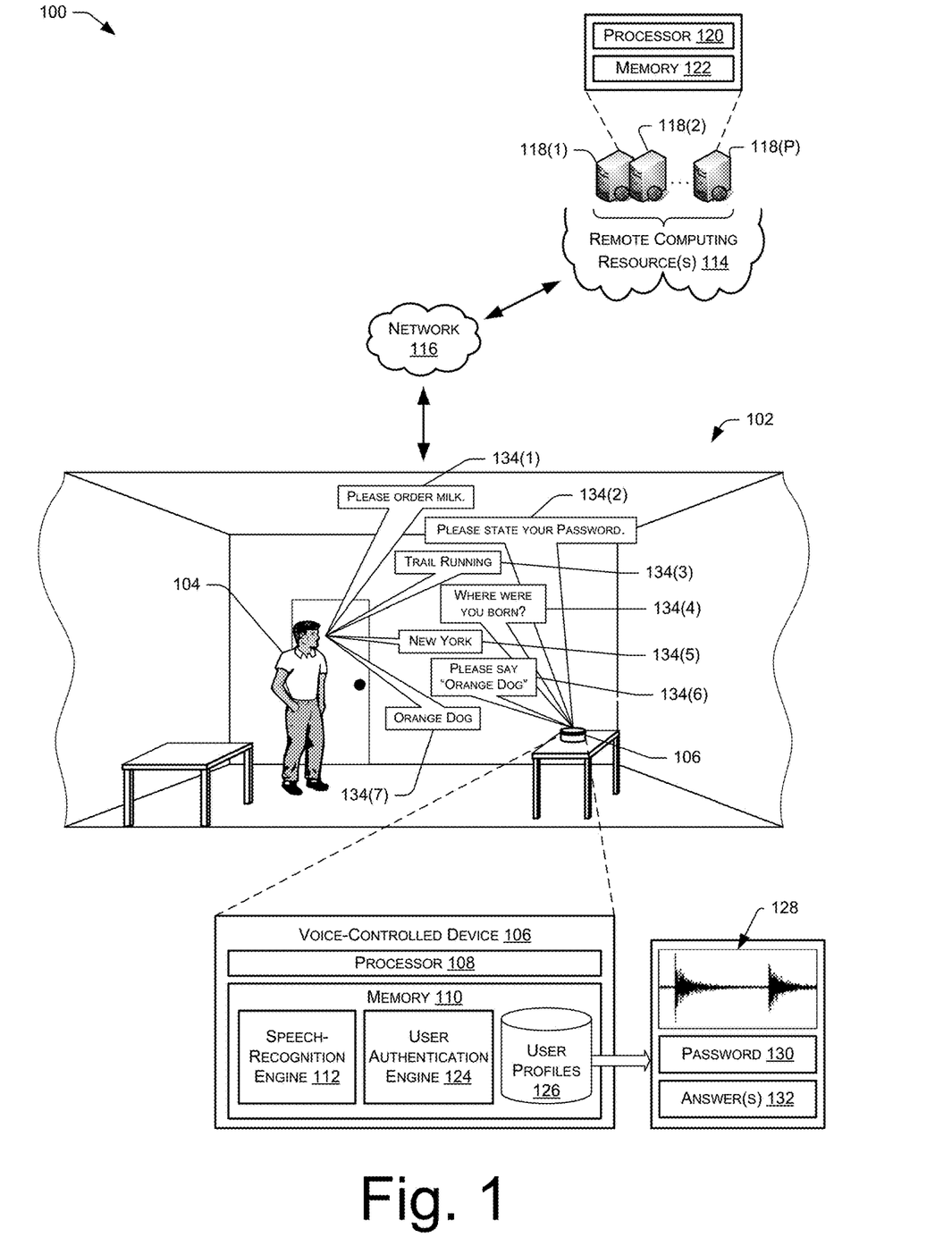
FIG. 1 shows an illustrative voice interaction computing architecture set in a home environment. The architecture includes a voice-controlled device physically situated in the home, along with a user who is attempting to authenticate with the voice-controlled device. In order to authenticate the user, the voice-controlled device may engage the user in a back-and-forth conversation to verify the user's identity.

FIG. 1 shows an illustrative voice interaction computing architecture 100 set in a home environment 102 that includes a user 104. The architecture 100 also includes an electronic voice-controlled device 106 with which the user 104 may interact. In the illustrated implementation, the voice-controlled device 106 is positioned on a table within a room the home environment 102. In other implementations, it may be placed in any number of locations (e.g., ceiling, wall, in a lamp, beneath a table, under a chair, etc.). Further, more than one device 106 may be positioned in a single room, or one device may be used to accommodate user interactions from more than one room.

Generally, the voice-controlled device 106 has at least one microphone and at least one speaker to facilitate audio interactions with the user 104 and/or other users. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 2.

The microphone of the voice-controlled device 106 detects audio from the environment 102, such as sounds uttered from the user 104, and generates a corresponding audio signal. As illustrated, the voice-controlled device 106 includes a processor 108 and memory 110, which stores or otherwise has access to a speech-recognition engine 112. As used herein, a processor may include multiple processors and/or a processor having multiple cores. The speech-recognition engine 112 performs speech recognition on audio captured by the microphone, such as utterances spoken by the user 104. The voice-controlled device 106 may perform certain actions in response to recognizing different speech from the user 104. The user may speak predefined commands (e.g., "Awake"; "Sleep"), or may use a more casual conversation style when interacting with the device 106 (e.g., "I'd like to go to a movie. Please tell me what's playing at the local cinema.").

In some instances, the voice-controlled device 106 may operate in conjunction with or may otherwise utilize computing resources 114 that are remote from the environment 102. For instance, the voice-controlled device 106 may couple to the remote computing resources 114 over a network 116. As illustrated, the remote computing resources 114 may be implemented as one or more servers 118(1), 118(2), . . . , 118(P) and may, in some instances form a portion of a network-accessible computing platform implemented as a computing infrastructure of processors, storage, software, data access, and so forth that is maintained and accessible via a network such as the Internet. The remote computing resources 114 do not require end-user knowledge of the physical location and configuration of the system that delivers the services. Common expressions associated for these remote computing devices 114 include "on-demand computing", "software as a service (SaaS)", "platform computing", "network-accessible platform", "cloud services", "data centers", and so forth.

The servers 118(1)-(P) include a processor 120 and memory 122, which may store or otherwise have access to some or all of the components described with reference to the memory 110 of the voice-controlled device 106. For instance, the memory 122 may have access to and utilize the speech-recognition engine 112 for receiving audio signals from the device 106, recognizing speech and, potentially, causing performance of an action in response. In some examples, the voice-controlled device 106 may upload audio data to the remote computing resources 114 for processing, given that the remote computing resources 114 may have a computational capacity that far exceeds the computational capacity of the voice-controlled device 106. Therefore, the voice-controlled device 106 may utilize the speech-recognition engine 112 at the remote computing resources 114 for performing relatively complex analysis on audio captured from the environment 102.

Regardless of whether the speech recognition occurs locally or remotely from the environment 102, the voice-controlled device 106 may receive vocal input from the user 104 and the device 106 and/or the resources 114 may perform speech recognition to interpret a user's operational request or command. The requests may be for essentially type of operation, such as authentication, database inquires, requesting and consuming entertainment (e.g., gaming, finding and playing music, movies or other content, etc.), personal management (e.g., calendaring, note taking, etc.), online shopping, financial transactions, and so forth.

The voice-controlled device 106 may communicatively couple to the network 116 via wired technologies (e.g., wires, USB, fiber optic cable, etc.), wireless technologies (e.g., RF, cellular, satellite, Bluetooth, etc.), or other connection technologies. The network 116 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

As illustrated, the memory 110 of the voice-controlled device 106 also stores or otherwise has access to a user authentication engine 124 and one or more user profiles 126. The user authentication engine 124 functions to authenticate a user that desires to interact with the device. For instance, in response to (or prior to) the user requesting that the device 106 perform a particular operation, the user authentication engine 124 may attempt to verify the identity of the user for the purpose of ensuring that the requesting user has authorization to instruct the device 106 to perform the requested operation. In some instances, the user authentication engine 124 authenticates a user based on audio uttered by the user in response to audio output by a speaker of the voice-controlled device 106.

For instance, FIG. 1 illustrates at 134(1) the user 104 requesting that the voice-controlled device 106 "Please order milk" on behalf of the user 104. If the device 106 authenticates the user 104 and determines that the user 104 has authorization to instruct the device 106 to perform this operation, then the device 106 may place an order for milk for the user 104 over the network 116, may add milk to a grocery list associated with the user 104, or the like.

Prior to placing this order or adding milk to the grocery list, however, at 134(2) the device 106 audibly outputs a request for the user to "Please state your password". At 134(3) and in response, the user 104 utters his password "Trail Running". The microphone of the device 106 captures the sound, generates an audio signal and passes the signal to the speech-recognition engine 112 (locally or at the remote computing resources 114) for identifying the speech of the user. The engine 112 then passes an indication of the speech ("Trail Running") to the user authentication engine 124.

In response to receiving the password spoken by the user 104, the engine 124 may locate a user profile associated with the user 104 from the datastore 126. As illustrated, the user profile may include, in part, an audio signature 128 associated with a user, a password 130 associated with the user and one or more answers 132 to corresponding questions, with the user having previously selected the answers. After locating the proper user profile, the user authentication engine 124 may compare the password spoken by the user 104 to the password 130 stored in the profile. If the passwords do not match, then the engine 124 may indicate that authentication has failed and the device 106 may output a response indicating this failure. For instance, the device 106 may request that the user 104 speak his password again, that authentication has failed, or the like.

If, however, the passwords match, then the user authentication engine 124 may generate an audio signature from the audio signal and compare this audio signature to the audio signature 128 from the user's profile. The audio signature 128 from the profile may uniquely identify the user's voice based on volume, pitch, tone, frequency, and the like. If these signatures do not match, then the engine 124 may again indicate that authentication has failed.

If the signatures match, however, then at 134(4) the device outputs a question having an answer previously selected by the user associated with the profile, with the answer 132 being stored in the profile. In this example, the device 106 audibly outputs the following question: "Where were you born?" At 134(5), the user responds to the question with an answer of "New York".

The microphone of the device 106 again captures this sound, generates a corresponding audio signal and passes the signal to the speech-recognition engine 112 for identifying speech therein. In this example, the engine 112 identifies "New York" from the signal and passes an indication of this finding to the user authentication engine 124. The engine 124 then compares this answer received from the user 104 to the corresponding answer 132 stored in the profile. If the answers do not match, then the device 106 indicates that authentication has failed. If the answers match, then the device 106 compares the audio signature associated with the speech "New York" to the signature 128. If the signatures do not match, then the device 106 indicates that authentication has failed.

If, however, the signatures match, then at 134(6) the device 106 audibly outputs a request that the user 104 state a randomly generated phrase (here, "Orange Dog"). At 134(7), the user 104 states the random phrase ("Orange Dog"). The microphone captures sound from the environment 102, generates a corresponding audio signal and passes this signal to the speech-recognition engine 112. Here, the engine 112 identifies the phrase "Orange Dog" from the audio signal and passes this indication to the user authentication engine 124.

In response to receiving the phrase spoken by the user, the user authentication engine 124 determines whether the spoken phrase matches the requested random phrase. If not, then the device 106 indicates that authentication has failed. If so, then the device 106 compares an audio signature associated with the user 104 speaking the random phrase to the audio signature 128. If the signatures do not match, then the device 106 indicates that authentication has failed. If, however, the signatures match, then the device 106 may perform the requested operation (e.g., may place an order for the milk and inform the user that the order has been placed).

Illustrative Voice-Controlled Device

Figure 2:
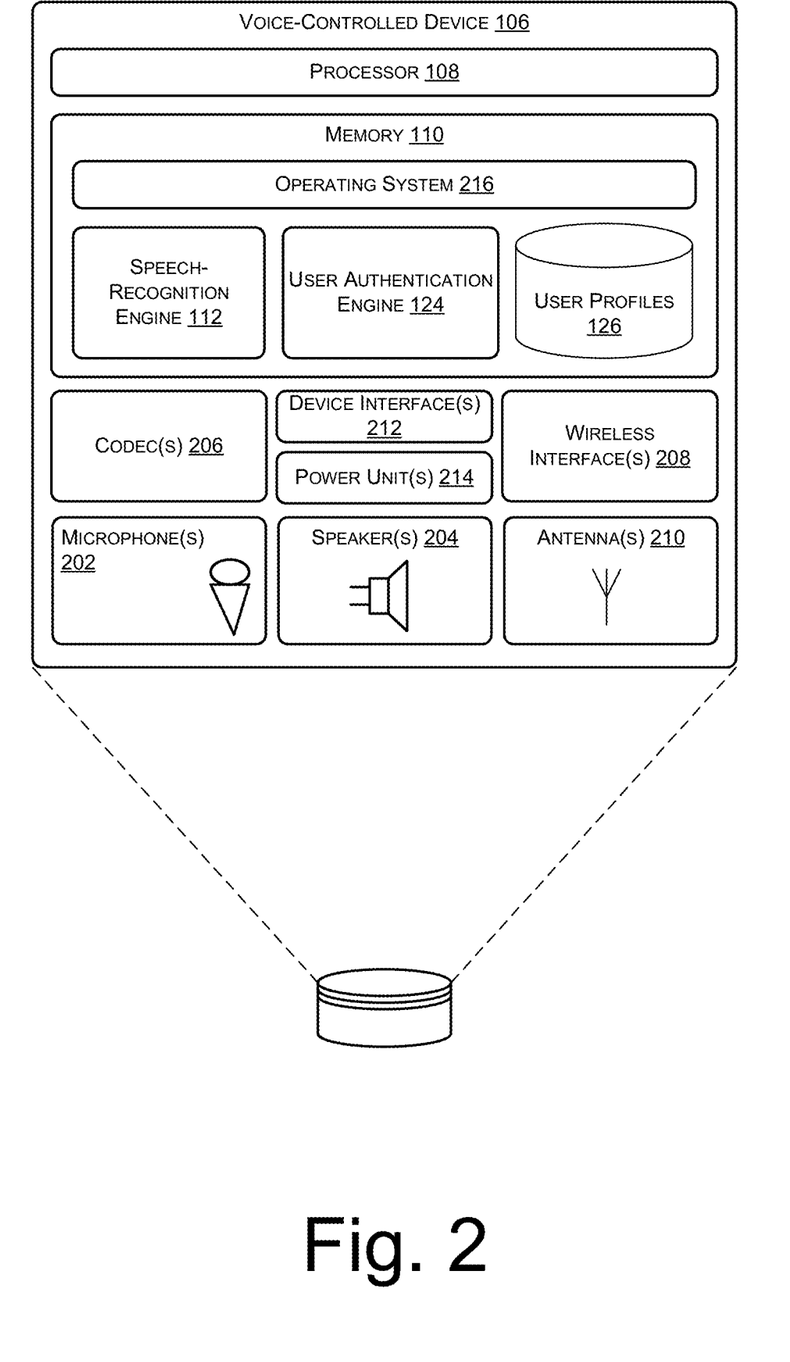
FIG. 2 shows a block diagram of selected functional components implemented in the voice-controlled device of FIG. 1.

FIG. 2 shows selected functional components of one implementation of the voice-controlled device 106 in more detail. Generally, the voice-controlled device 106 may be implemented as a standalone device that is relatively simple in terms of functional capabilities with limited input/output components, memory and processing capabilities. For instance, the voice-controlled device 106 does not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 includes the processor 108 and memory 110. The memory 110 may include computer-readable storage media ("CRSM"), which may be any available physical media accessible by the processor 108 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 108.

The voice-controlled device 106 includes one or more microphones 202 to receive audio input, such as user voice input, and one or more speakers 204 to output audio sounds. One or more codecs 206 are coupled to the microphone 202 and speaker 204 to encode and/or decode the audio signals. The codec may convert audio data between analog and digital formats. A user may interact with the device 106 by speaking to it, and the microphone 202 captures sound and generates an audio signal that includes the user speech. The codec 206 encodes the user speech and transfers that audio data to other components. The device 106 can communicate back to the user by emitting audible statements through the speaker 204. In this manner, the user interacts with the voice-controlled device simply through speech, without use of a keyboard or display common to other types of devices.

In the illustrated example, the voice-controlled device 106 includes one or more wireless interfaces 208 coupled to one or more antennas 210 to facilitate a wireless connection to a network. The wireless interface 208 may implement one or more of various wireless technologies, such as wifi, Bluetooth, RF, and so on.

One or more device interfaces 212 (e.g., USB, broadband connection, etc.) may further be provided as part of the device 106 to facilitate a wired connection to a network, or a plug-in network device that communicates with other wireless networks. One or more power units 214 are further provided to distribute power to the various components on the device 106.

The voice-controlled device 106 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be one or more simple light elements (e.g., LEDs around perimeter of a top portion of the device) to indicate a state such as, for example, when power is on. But, otherwise, the device 106 does not use or need to use any input devices or displays in some instances.

Several modules such as instruction, datastores, and so forth may be stored within the memory 110 and configured to execute on the processor 108. An operating system module 216 is configured to manage hardware and services (e.g., wireless unit, USB, Codec) within and coupled to the device 106 for the benefit of other modules.

In addition, the memory 110 may include the speech-recognition engine 112, the user authentication engine 124 and the user profiles 126, discussed above. Also as discussed above, some or all of these engines, data stores, and components may reside additionally or alternatively at the remote computing resources 114.

Illustrative Process

Figure 3:
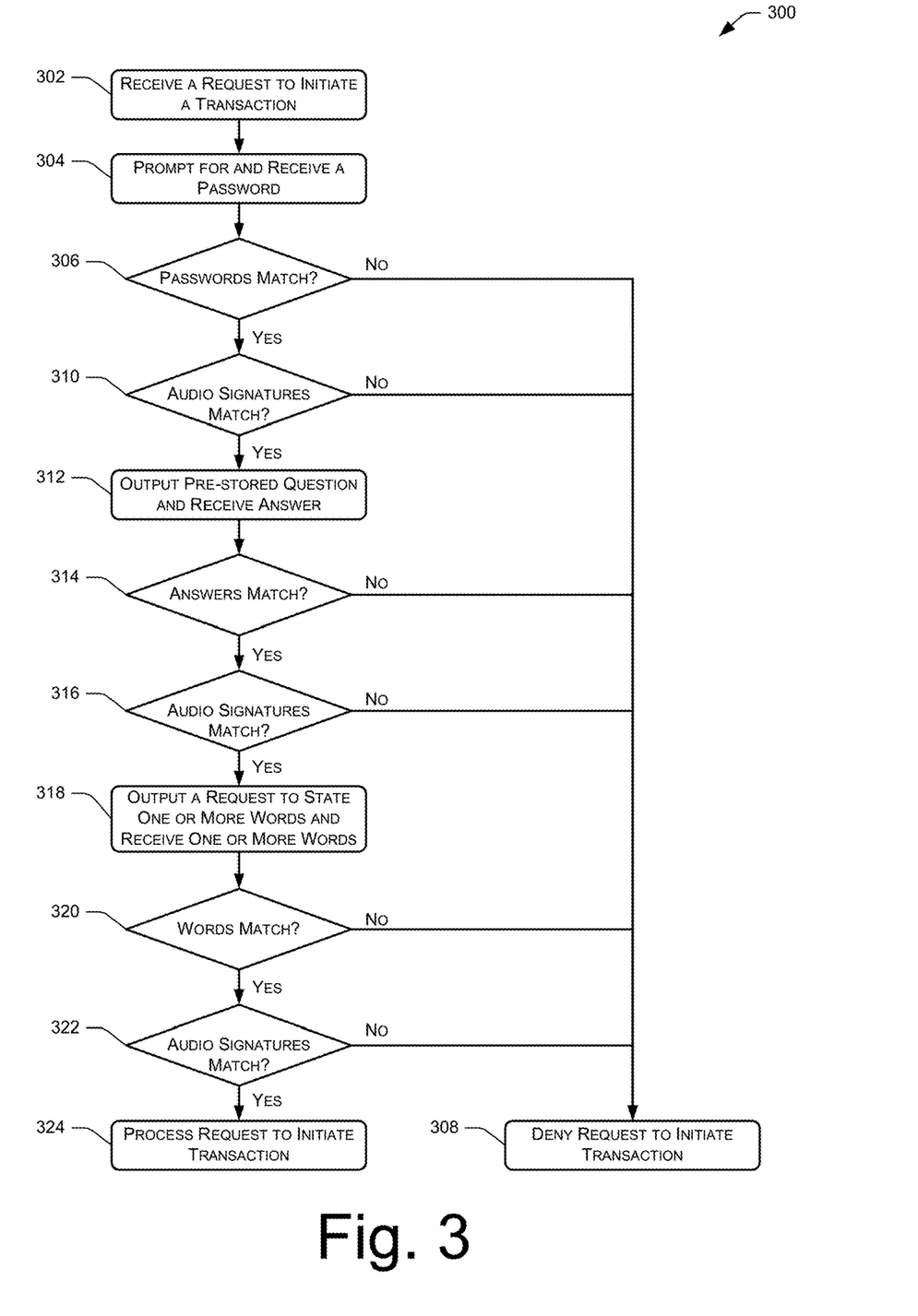
FIG. 3 depicts a flow diagram of an example process for authenticating a user at the voice-controlled device of FIG. 1 or at other devices with which a user interacts via speech.

FIG. 3 depicts a flow diagram of an example process 300 for authenticating a user at the voice-controlled device 106 or at another device with which a user interacts via speech. The voice-controlled device 106, the remote computing resources 114, other computing devices or a combination thereof may perform some or all of the operations described below.

The process 300 is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 302, the process 300 receives a request from a user to initiate a transaction. At 304, the process 300 prompts the user for a password associated with the user and, in response, receives a password spoken or spelled by the user. At 306, the process 300 determines whether the password spoken or spelled by the user matches a password previously associated with the user. If not, then at 308 the process 300 denies the user's request to initiate the transaction.

If, however, the passwords do match, then at 310 the process 300 determines whether an audio signature associated with the user's utterance of the password substantially matches an audio signature previously associated with the user. That is, the process 300 may determine whether the audio signature of the password spoken or spelled by the user has a calculated similarity score to the audio signature previously associated with the user that is greater than a threshold. If not, then at 308 the process 300 denies the initial request. If so, then at 312 the process 300 outputs a pre-stored question having an answer previously selected by the user and, in response to outputting the question, the process 300 receives an answer spoken by the user.

At 314, the process 300 determines whether the answer spoken by the user matches the previously selected answer. If not, then at 308 the process 300 denies the user's request. If the answers match, however, then at 316 the process 300 determines whether an audio signature associated with the user's answer matches the audio signature previously associated with the user. If not, then the process 300 denies the request.

If the audio signatures substantially match, meanwhile, then at 318 the process 300 outputs a request that the user state one or more words (e.g., a dynamically selected random phrase) and, in response, the process 300 receives an audio signal specifying one or more words spoken by the user. At 320, the process 300 determines whether the words spoken by the user match the requested word(s). If not, then at 308 the process 300 denies the user's request. If the words do match, however, then at 322 the process 300 compares an audio signature associated with the user's utterance of the one or more words to the audio signature previously associated with the user. If these signatures do not substantially match, then the process 300 denies the request at 308. If the signatures substantially match, then at 324 the process 300 initiates the transaction, given that the user has been successfully authenticated.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors; and
memory storing one or more computer-executable instructions that, when executed by the one or more processors, cause the one or more processors to perform operations comprising:
determining, in association with a user, one or more first words to be spoken by the user;
receiving a first audio signal representing a first utterance spoken by the user;
determining one or more first audio characteristics associated with the first audio signal;
storing the one or more first audio characteristics in association with a user profile associated with the user;
receiving a second audio signal representing a second utterance;
processing, using at least one of speech recognition or natural language processing techniques, the second audio signal;
determining, based at least partly on processing the second audio signal, that the second utterance includes one or more second words that represent a request for an operation associated with the user profile to be performed;
determining one or more second audio characteristics associated with the second audio signal, the one or more second audio characteristics including at least one of pitch, tone, or decibel level associated with the second audio signal;
determining that the one or more second audio characteristics are within a threshold similarity with respect to the one or more first audio characteristics; and
based at least partly on the request for the operation and the one or more second audio characteristics being within the threshold similarity with respect to the one or more first audio characteristics, causing audio data corresponding to performance of the operation to be output via one or more speakers of a user device associated with the user.

2. The system as recited in claim 1, wherein the operations further comprise:
determining an audio signature based at least partly on the one or more first audio characteristics; and
authenticating the user based at least partly on the audio signature.

3. The system as recited in claim 2, wherein the operations further comprise determining an identity of the user based at least partly on the one or more second audio characteristics, the one or more second audio characteristics including a frequency associated with the audio signal.

4. The system as recited in claim 1, wherein the operations further comprise causing the operation to occur.

5. The system as recited in claim 1, wherein the operations further comprise:
comparing the one or more first audio characteristics to the one or more second audio characteristics; and
determining, based at least partly on comparing the one or more first audio characteristics to the one or more second audio characteristics, an identity of the user.

6. The system as recited in claim 1, wherein the one or more first words are included within a text message sent to the user device.

7. The system as recited in claim 1, wherein the operations further comprise:
receiving the first audio signal from the user device having one or more microphones that captured the first utterance.

8. A method comprising:
receiving an audio signal representing an utterance;
processing the audio signal to determine one or more words included in the utterance;
determining, based at least partly on processing the audio signal, that the one or more words represent a request for an operation associated with a user profile to be performed;
determining one or more first audio characteristics associated with the audio signal, the one or more first audio characteristics including at least one of pitch, tone, or decibel level associated with the audio signal;
determining that the one or more first audio characteristics are within a threshold similarity with respect to one or more second audio characteristics previously stored in association with the user profile; and
based at least partly on the request for the operation and the one or more first audio characteristics being within the threshold similarity with respect to the one or more second audio characteristics, causing audio data corresponding to performance of the operation to be output via one or more speakers of a user device associated with the user profile.

9. The method as recited in claim 8, further comprising:
determining an audio signature based at least partly on the one or more second audio characteristics; and
authenticating a user associated with the user profile based at least partly on the audio signature.

10. The method as recited in claim 9, further comprising determining, based at least partly on the one or more first audio characteristics, an identity of a user associated with the user profile.

11. The method as recited in claim 9, wherein the one or more second audio characteristics include a frequency that is identifiable from the audio signal.

12. The method as recited in claim 8, further comprising:
maintaining the one or more second audio characteristics previously stored in association with the user profile;
comparing the one or more second audio characteristics to the one or more first audio characteristics; and
determining, based at least partly on comparing the one or more second audio characteristics to the one or more first audio characteristics, an identity of the user.

13. The method as recited in claim 8, further comprising requesting that a user associated with the user profile audibly output one or more second words included within a text message sent to the user device.

14. The method as recited in claim 8, further comprising:
causing, via the one or more speakers of the user device that captured the utterance, output of an audible request for a user associated with the use profile to audibly utter the one or more second words; and
determining that the utterance corresponds to the one or more words.

15. A method comprising:
receiving an audio signal representing an utterance, the utterance being captured by one or more microphones of a user device associated with a user profile;
processing the audio signal to determine that the utterance includes a request for an operation associated with the user profile to be performed;
determining one or more first audio characteristics associated with the audio signal, the one or more first audio characteristics including at least one of pitch, tone, or decibel level associated with the audio signal;
determining that the one or more first audio characteristics are outside a threshold similarity with respect to one or more second audio characteristics previously stored in association with the user profile; and
based at least partly on the request for the operation and the one or more first audio characteristics being outside the threshold similarity with respect to the one or more second audio characteristics, refraining from performing the operation.

16. The method as recited in claim 15, further comprising:
determining an audio signature based at least partly on the one or more second audio characteristics; and
determining that the audio signal corresponds to a second user different than a user associated with the user profile based at least partly on the audio signature.

17. The method as recited in claim 16, further comprising determining an identity of a user associated with the user profile based at least partly on the one or more second audio characteristics, the one or more second audio characteristics including a frequency associated with the audio signal.

18. The method as recited in claim 15, further comprising:
receiving a second audio signal representing a second utterance, the second utterance being captured by the one or more microphones of the user device;
determining the one or more second audio characteristics associated with the second audio signal; and
storing the one or more second audio characteristics in association with the user profile.

19. The method as recited in claim 15, further comprising:
causing, via one or more speakers of the user device, output of audio data indicating that the operation is not to be performed.

20. The method as recited in claim 15, further comprising requesting that a user associated with the user profile audibly output one or more second words included within a text message sent to the user device.

* * * * *